United States Patent
Kirkpatrick et al.

(10) Patent No.: US 9,777,593 B2
(45) Date of Patent: Oct. 3, 2017

(54) HYBRID METAL AND COMPOSITE SPOOL FOR ROTATING MACHINERY

(71) Applicant: General Electric Company, Schenectady, NY (US)

(72) Inventors: Bowden Kirkpatrick, Bennington, VT (US); Nicholas Joseph Kray, Mason, OH (US); Todd Alan Anderson, Niskayuna, NY (US); Stefaan Guido Van Nieuwenhove, Hohenkammer (DE); Po-Ching Yeh, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 328 days.

(21) Appl. No.: 14/628,311

(22) Filed: Feb. 23, 2015

(65) Prior Publication Data

US 2016/0245086 A1    Aug. 25, 2016

(51) Int. Cl.
*F01D 5/30* (2006.01)
*F01D 25/00* (2006.01)
(Continued)

(52) U.S. Cl.
CPC ............ *F01D 25/005* (2013.01); *F01D 5/06* (2013.01); *F01D 5/282* (2013.01); *F01D 5/3023* (2013.01);
(Continued)

(58) Field of Classification Search
CPC . F01D 5/06; F01D 5/02; F01D 11/001; F01D 11/02; F01D 5/302; F05D 2230/02;
(Continued)

(56) References Cited

U.S. PATENT DOCUMENTS 3,554,668 A    1/1971   Wagle
3,610,777 A    10/1971  Wagle
(Continued)

FOREIGN PATENT DOCUMENTS

EP    1531234 B1    11/2006
EP    1681440 B1    8/2013
(Continued)

OTHER PUBLICATIONS

European Search Report issued in connection with corresponding EP Application No. 16156495.0 dated Sep. 23, 2016.
(Continued)

*Primary Examiner* — Ninh H Nguyen
(74) *Attorney, Agent, or Firm* — General Electric Company; William Scott Andes (57) ABSTRACT

A hybrid metal and composite spool includes metal rings on an outer diameter of a composite spool shell. Metal rings may include features such as annular or axial dovetail slots. Adhesive layers may be between the metal rings and composite shell which may be connected by a shrink bonded joint. The metal rings may include a single seal tooth ring with an annular radially extending seal tooth. A method for fabricating the spool may include fabricating one or more metal rings with the features therein, positioning the metal rings in place on an outer surface of an uncured composite spool shell of the spool before curing the shell, and curing the shell with the one or more metal rings positioned in place. Alternatively, rings may be heated to a temperature at least sufficient to slide rings over a cured composite shell, and allowed to cool and shrink onto shell.

17 Claims, 6 Drawing Sheets

(51) Int. Cl.
*F01D 11/02* (2006.01)
*F01D 5/06* (2006.01)
*F01D 5/28* (2006.01)

(52) U.S. Cl.
CPC .......... *F01D 11/02* (2013.01); *F05B 2240/24* (2013.01); *F05D 2230/20* (2013.01); *F05D 2230/23* (2013.01); *Y02T 50/672* (2013.01)

(58) Field of Classification Search
CPC ............. F05D 2240/24; F05D 2240/55; F05D 2300/603
See application file for complete search history.

(56) References Cited

U.S. PATENT DOCUMENTS

| | | | |
|---|---|---|---|
| 3,765,796 A | | 10/1973 | Stargardter et al. |
| 3,813,185 A | * | 5/1974 | Bouiller .................... F01D 5/06 415/173.7 |
| 4,191,510 A | * | 3/1980 | Teysseyre ................. F01D 5/06 416/218 |
| 4,730,983 A | | 3/1988 | Naudet et al. |
| 4,747,900 A | | 5/1988 | Angus |
| 4,786,347 A | | 11/1988 | Angus |
| 5,013,216 A | | 5/1991 | Bailey et al. |
| 5,018,271 A | | 5/1991 | Bailey et al. |
| 5,049,036 A | | 9/1991 | Bailey et al. |
| 5,281,096 A | | 1/1994 | Harris et al. |
| 5,378,110 A | | 1/1995 | Ress, Jr. |
| 5,472,315 A | | 12/1995 | Alexander et al. |
| 5,482,433 A | | 1/1996 | Norris et al. |
| 5,547,342 A | | 8/1996 | Furseth et al. |
| 5,569,019 A | | 10/1996 | Katariya et al. |
| 5,626,462 A | | 5/1997 | Jackson et al. |
| 5,632,600 A | | 5/1997 | Hull |
| 6,203,273 B1 | | 3/2001 | Weiner et al. |
| 6,220,815 B1 | | 4/2001 | Rainous et al. |
| 6,416,276 B1 | | 7/2002 | Marmilic et al. |
| 6,471,485 B1 | | 10/2002 | Rossmann et al. |
| 6,991,433 B2 | | 1/2006 | Mons |
| 7,198,472 B2 | | 4/2007 | McMillan et al. |
| 7,278,830 B2 | | 10/2007 | Vetters |
| 7,435,056 B2 | | 10/2008 | Liston |
| 7,491,032 B1 | | 2/2009 | Powell et al. |
| 7,780,420 B1 | | 8/2010 | Matheny |
| 7,828,526 B2 | | 11/2010 | Cairo et al. |
| 7,918,644 B2 | | 4/2011 | Schreiber |
| 7,931,443 B1 | | 4/2011 | Potter et al. |
| 8,011,882 B2 | | 9/2011 | McMillan |
| 8,016,561 B2 | | 9/2011 | Moniz et al. |
| 8,061,997 B2 | | 11/2011 | Le Hong et al. |
| 8,282,355 B2 | | 10/2012 | Blanchard et al. |
| 8,366,378 B2 | | 2/2013 | Beckford et al. |
| 8,449,260 B2 | * | 5/2013 | Xie ........................... F01D 5/06 416/189 |
| 8,757,980 B2 | | 6/2014 | Belmonte et al. |
| 8,834,125 B2 | | 9/2014 | Alvanos et al. |
| 8,905,719 B2 | | 12/2014 | Kray et al. |
| 2009/0180886 A1 | | 7/2009 | Derclaye et al. |
| 2010/0129227 A1 | | 5/2010 | Schilling et al. |
| 2010/0178159 A1 | | 7/2010 | Bulgrin et al. |
| 2010/0189562 A1 | | 7/2010 | Blanchard et al. |
| 2011/0014041 A1 | | 1/2011 | Lhoest |
| 2011/0127352 A1 | | 6/2011 | Fachat et al. |
| 2012/0134786 A1 | | 5/2012 | Cairo et al. |
| 2013/0101429 A1 | | 4/2013 | Roussille et al. |
| 2014/0030076 A1 | | 1/2014 | Nunez et al. |
| 2014/0030106 A1 | | 1/2014 | Schreiber |
| 2014/0030107 A1 | | 1/2014 | Schreiber |
| 2014/0072443 A1 | | 3/2014 | Mateo et al. |
| 2014/0079552 A1 | | 3/2014 | Englebert |
| 2014/0147276 A1 | | 5/2014 | Roberts, III et al. |
| 2014/0186166 A1 | | 7/2014 | Kostka |

FOREIGN PATENT DOCUMENTS

| | | |
|---|---|---|
| EP | 1681439 B1 | 1/2014 |
| EP | 2142761 B1 | 3/2014 |
| JP | 2000186507 A | 7/2000 |
| JP | 2001280101 A | 10/2001 |
| JP | 2009156262 A | 7/2009 |
| JP | 2010001840 A | 1/2010 |
| JP | 2010164049 A | 7/2010 |
| JP | 2011517479 A | 6/2011 |
| JP | 2014105705 A | 6/2014 |
| WO | 2008122751 A2 | 10/2008 |
| WO | 2014190008 A1 | 11/2014 |

OTHER PUBLICATIONS

Unofficial English Translation of Japanese Search Report issued in connection with corresponding JP Application No. 2016026458 dated Jan. 25, 2017.

Unofficial English Translation of Japanese Office Action issued in connection with corresponding JP Application No. 2016026458 dated Feb. 7, 2017.

* cited by examiner

HYBRID METAL AND COMPOSITE SPOOL FOR ROTATING MACHINERY

BACKGROUND OF THE INVENTION

Field of the Invention

The invention relates to rotating machinery spools and, particularly, to composite spools.

Description of Related Art

Spools are used in a great many types of rotating machinery to support rotating features of the machinery. One exemplary type of rotating machinery is gas turbine engines having spools such as rotors, drums, and disks. It is known to use composite spools for rotating machinery to reduce weight of the spools and the machinery. Composite rotors or disks for gas turbine engines are known in the art. Turbofan gas turbine engines generally include a forward fan and booster compressor, a middle core engine, and an aft low pressure power turbine. Gas turbine engine rotors or disks generally have been manufactured of metallic materials usually as single items machined from a solid metal billet or as several elements welded together. Features machined into the metal disks and rotors include dovetail slots to receive dovetail roots of fan, booster, compressor, and turbine blades. Metal disks and rotors are relatively heavy. Metals have a lower specific strength and have very little inherent damping as compared to composite materials. The major benefit of composite spools such as disks and drums and rotors is to significantly reduce the weight and mass moment of inertia of the spool. While composites offer good strength and stiffness properties with respect to metals, they may lack robustness in tribological performance.

Composite integrally bladed rotors for use in gas turbine engines have been disclosed in several patents such as U.S. Pat. Nos. 4,747,900, 4,786,347, and 7,491,032. Composite integrally bladed rotors are subject to large forces which must be taken into account in designing the construction of the rotor to preserve its integrity. In the rotor disc, the major forces are exerted in circumferential directions so an ability to absorb hoop stress is important, whereas in the airfoil blades radially exerted forces predominate. Composite material used in such rotors typically include a resin (such as epoxy) which has low inherent strength. The composite material has a specific strength higher than that of metal due to the inclusion of fibers normally of the same material embedded in a matrix of the composite material. The fibers are known to be strongest in tension so the direction of the forces in the finished component will, at least in part, determine its strength. In some instances, the structural design of the component has been influenced by the need for fiber orientation.

It is highly desirable to have a design and method for manufacturing rotating machinery spools that are lightweight, strong, and robust.

SUMMARY OF THE INVENTION

A hybrid metal and composite spool includes one or more metal rings on an outer diameter or an outer surface of a composite spool shell of the spool. The hybrid metal and composite spool may include features in the one or more metal rings.

The spool may include a shrink bonded joint between the one or more metal rings and the composite spool shell. One or more annular adhesive layers may be between the one or more metal rings and the composite spool shell. A shrink bonded joint including the annular adhesive layers may be between the one or more metal rings and the composite spool shell.

The features may include dovetail slots in the metal rings. The metal rings may include at least one single seal tooth ring with an annular radially extending tooth. The metal rings may include at least one multi-tooth seal tooth ring having at least two annular axially spaced apart teeth radially extending away from an annular base connecting the at least two annular axially spaced apart teeth.

The metal rings may include forward and aft dovetail slot metal rings, an axially aftwardly extending annular tooth attached to the forward dovetail slot metal ring, and an axially forwardly extending annular tooth attached to the aft dovetail slot metal ring.

A method for fabricating a hybrid metal and composite spool includes fabricating one or more metal rings with features therein, positioning the one or more metal rings in place on an outer surface and/or an inner surface of an uncured composite spool shell of the spool before curing the shell, and curing the shell with the one or more metal rings positioned in place on the outer surface and/or the inner surface. The one or more metal rings may be bonded to the uncured composite spool shell by applying one or more annular adhesive layers between the one or more metal rings and the composite spool shell before the curing.

An alternative method for fabricating a hybrid metal and composite spool includes fabricating one or more metal rings with features therein, heating the one or more metal rings to a temperature at least sufficient to slide the rings over a cured composite spool shell, sliding the heated one or more metal rings in place on an outer surface of the cured composite spool shell of the spool, and allowing the one or more metal rings to cool and shrink onto the cured shell. One or more annular adhesive layers may be applied on the cured composite spool shell before sliding the heated one or more metal rings in place over the one or more annular adhesive layers.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
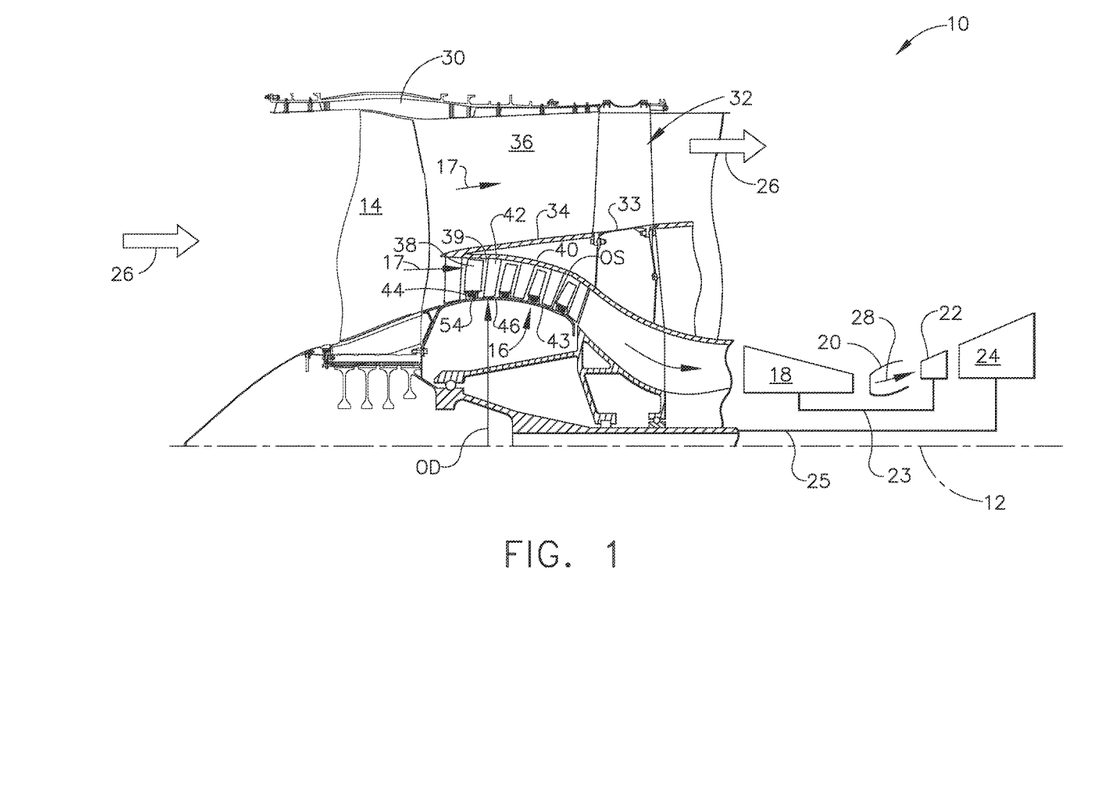
FIG. 1 is a longitudinal part sectional and part diagrammatical view illustration of an exemplary embodiment of an aircraft turbofan gas turbine engine with a hybrid metal and composite spool or rotor in a booster of the engine.
Figure 2:
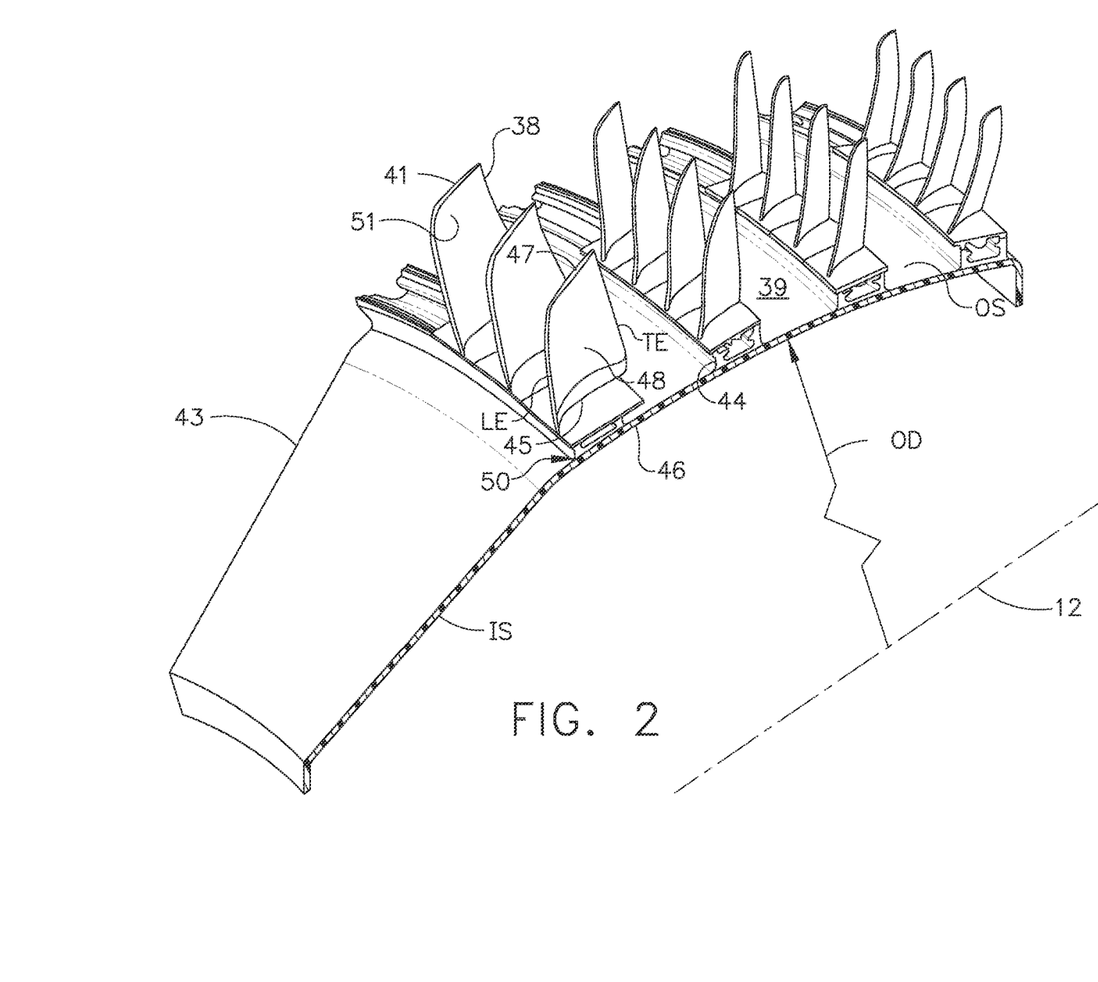
FIG. 2 is a forward looking aft perspective view illustration of a portion of the booster spool illustrated in FIG. 1.
Figure 3:
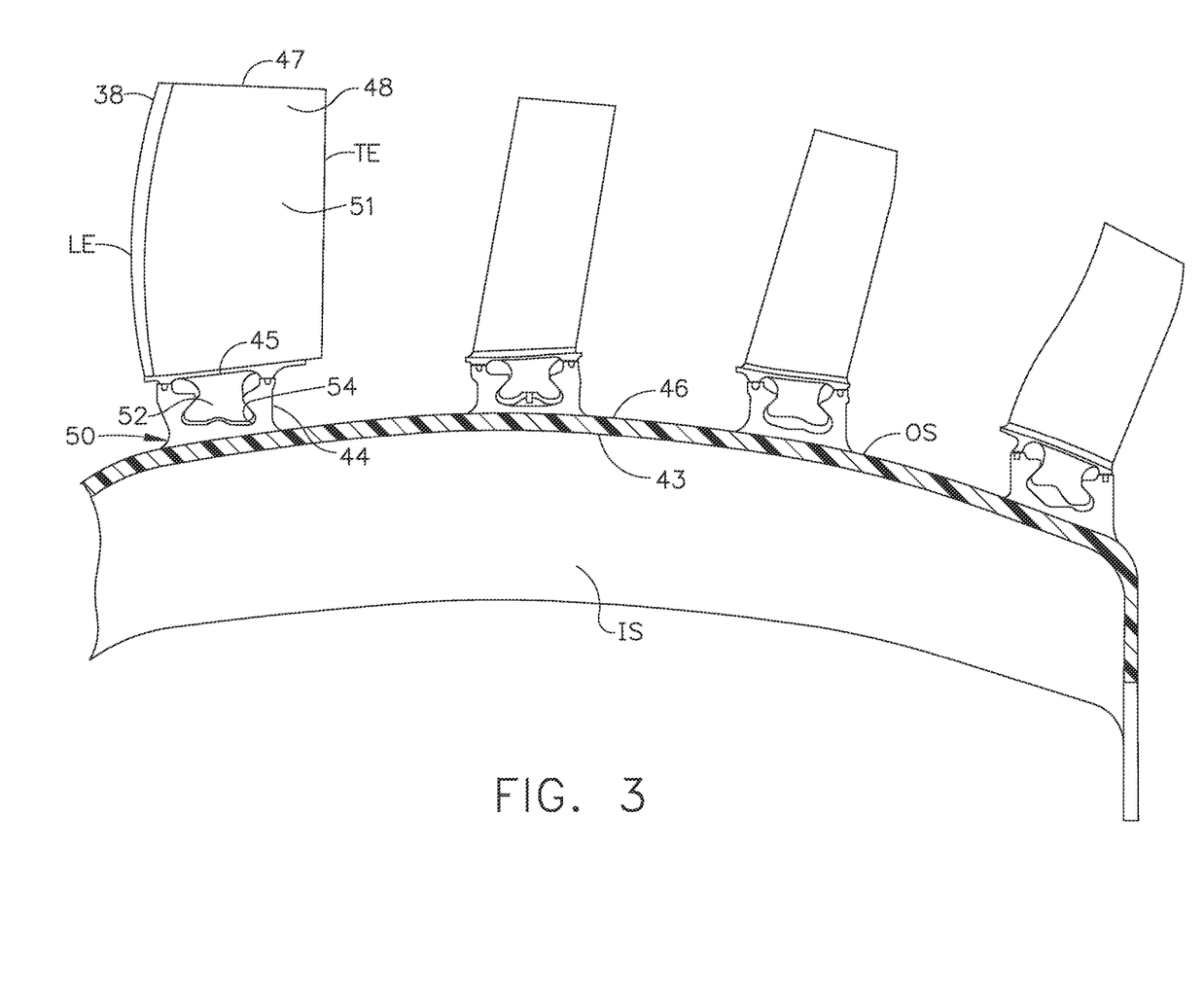
FIG. 3 is a sideways perspective view illustration through the booster spool portion illustrated in FIG. 2.
Figure 4:
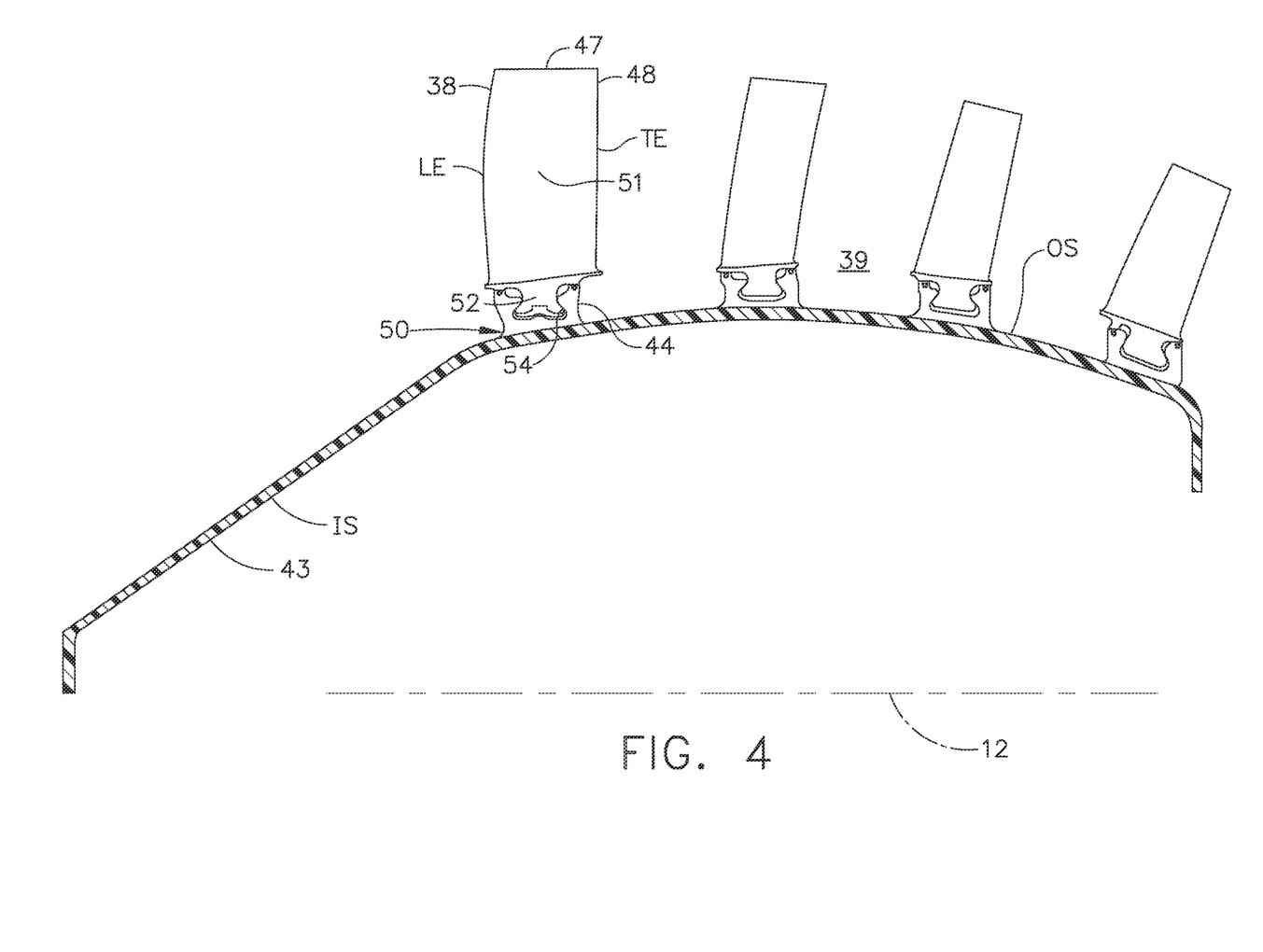
FIG. 4 is a cross-sectional view illustration of the booster spool illustrated in FIG. 2.
Figure 5:
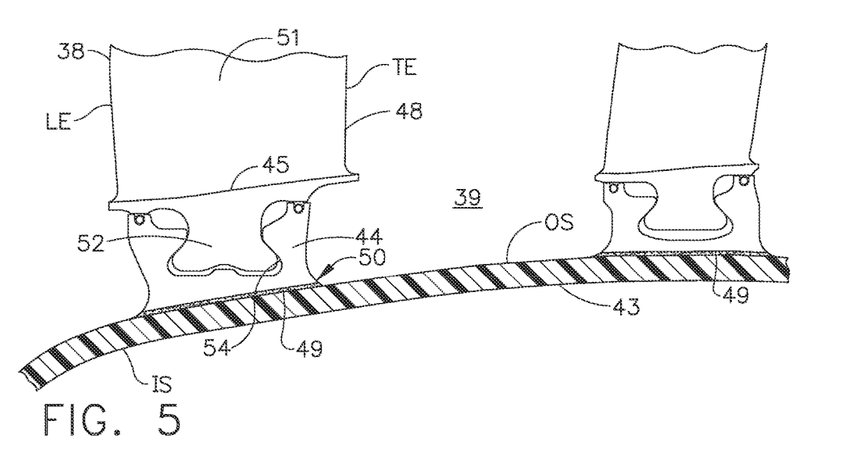
FIG. 5 is an enlarged cross-sectional view illustration of dovetail slot rings of the booster spool illustrated in FIG. 2.

Illustrated in FIG. 1 is an example of a hybrid metal and composite spool 43 or rotor which may be used for a booster spool 43 in a gas turbine booster 16 disclosed herein. The hybrid metal and composite spool 43 includes one or more metal rings 44 on an outer diameter OD or outer surface OS of a composite spool shell 46 of the spool 43. The metal rings 44 may have features such as dovetail slots 54 in the metal ring 44 illustrated in FIG. 5 and seal tooth rings 58 illustrated in FIG. 6. Dovetail slots include annular dovetail slots 54 as illustrated in FIG. 5 and axially extending dovetail slots.

Illustrated in FIG. 1 is an exemplary aircraft turbofan gas turbine engine 10 circumscribed about an engine centerline axis 12 and suitably designed to be mounted to a wing or fuselage of an aircraft. The engine 10 includes, in downstream serial flow communication, a fan 14, the booster 16, a high pressure compressor 18, a combustor 20, a high pressure turbine (HPT) 22, and a low pressure turbine (LPT) 24. The HPT or high pressure turbine 22 is joined by a high pressure drive shaft 23 to the high pressure compressor 18. The LPT or low pressure turbine 24 is joined by a low pressure drive shaft 25 to both the fan 14 and the booster 16.

In typical operation, air 26 is pressurized by the fan 14 and produces an inner air flow 15 channeled through the booster 16 which further pressurizes the inner air flow 15. The pressurized air is then flowed to the high pressure compressor 18 which further pressurizes the air. The pressurized air is mixed with fuel in the combustor 20 for generating hot combustion gases 28 that flow downstream in turn through the HPT 22 and the LPT 24.

A flow splitter 34 surrounding the booster 16 immediately behind the fan 14 includes a sharp leading edge 32 which splits the fan air 26 pressurized by the fan 14 into a radially inner stream (inner air flow 15) channeled through the booster 16 and a radially outer stream (bypass air flow 17) channeled through the bypass duct 36. A fan nacelle 30 surrounding the fan 14 is supported by an annular fan frame 33. The booster 16 includes alternating annular row of booster blades and vanes 38, 42 extending radially outwardly and inwardly across a booster flowpath 39 in a booster duct 40.

The annular row of booster blades 38 are suitably joined to the fan 14. The booster 16 is located forward of the fan frame 33 and is disposed radially inboard of the flow splitter 34. The booster spool 43 carries the booster blades 38 mounted in metal rings 44 on an outer diameter OD or outer surface OS of a composite spool shell 46 of the booster spool 43. The booster spool 43 is drivenly connected to the low pressure turbine 24 by the low pressure drive shaft 25. The booster spool 43 disclosed herein is an example of a hybrid metal and composite spool or rotor.

Referring to FIGS. 2-5, each of the booster blades 38 includes an airfoil 48 having pressure and suction sides 41, 51 extending outwardly from an airfoil base 45 to an airfoil tip 47. The airfoils 48 include chordwise spaced apart leading and trailing edges LE, TE. The booster blades 38 include dovetail blade roots 52 attached to the airfoils 48 at airfoil bases 45. The dovetail blade roots 52 are mounted in dovetail slots 54 in the metal rings 44 and, thus, attach the airfoils 48 and the booster blades 38 to the booster spool 43. An inner surface IS and outer surface OS of the composite spool shell 46 of the booster spool 43 are both smooth and uninterrupted and, thus, contribute to the strength and robustness of the spool 43.

Figure 6:
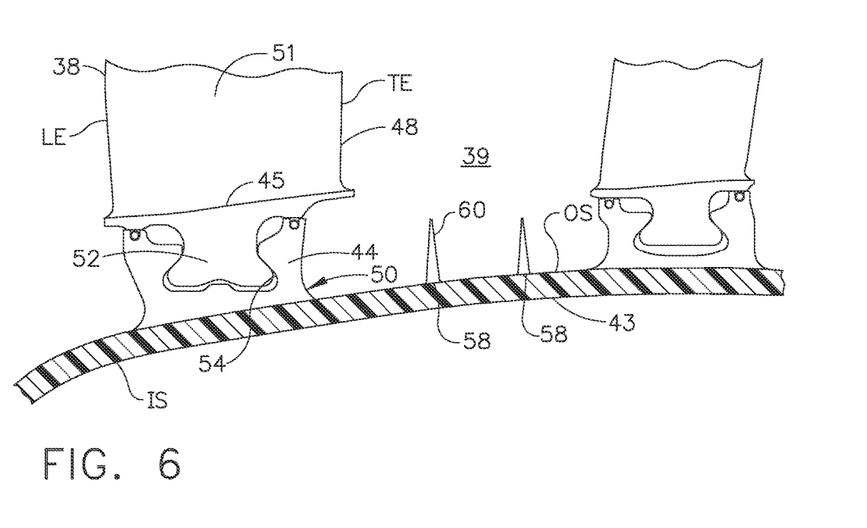
FIG. 6 is a cross-sectional view illustration of the booster spool illustrated in FIG. 5 with two seal teeth rings.
Figure 7:
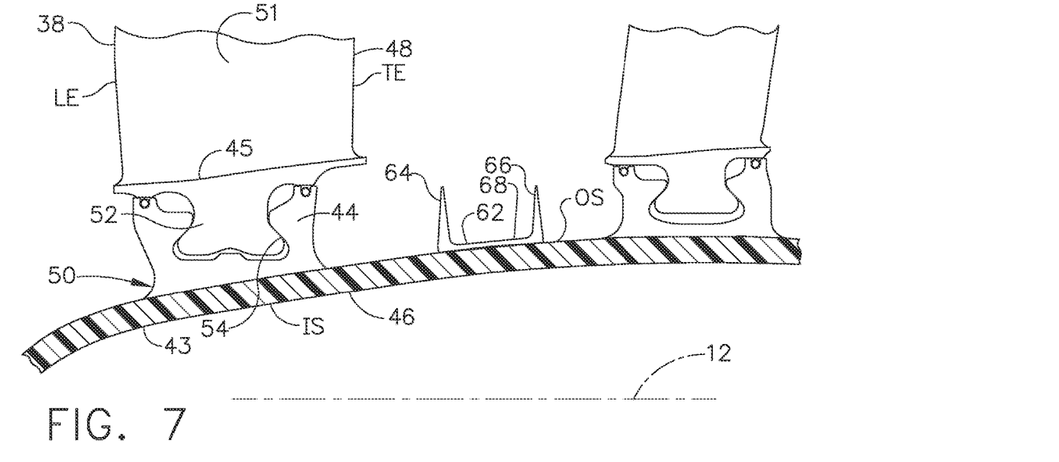
FIG. 7 is a cross-sectional view illustration of the booster spool illustrated in FIG. 5 with a dual seal teeth ring.

The metal rings 44 with the dovetail slots 54 may be generally referred to as dovetail slot metal rings and represent one type of metal ring that may be mounted on either the outer surface OS or the inner surface IS of the composite spool shell 46 of the booster spool 43. Illustrated in FIG. 6 is another type of metal ring in the form of a single tooth seal tooth ring 58 mounted on the outer surface OS of the composite spool shell 46 of the booster spool 43. The seal tooth ring 58 includes a single annular radially extending seal tooth 60 designed to seal against seal lands on the booster vanes 42 illustrated in FIG. 1. Two adjacent seal tooth rings 58 mounted on the outer surface OS of the composite spool shell 46 are illustrated in FIG. 6. FIG. 7 illustrates yet another type of metal ring in the form of a multi-tooth or dual tooth seal tooth ring 62 including at least two annular axially spaced apart and radially extending seal teeth such as forward and aft seal teeth 64, 66. The forward and aft seal teeth 64, 66 extend radially away from and are connected together by an annular base 68. The multi-tooth or dual tooth seal tooth ring 62 may be integrally formed or manufactured.

Figure 8:
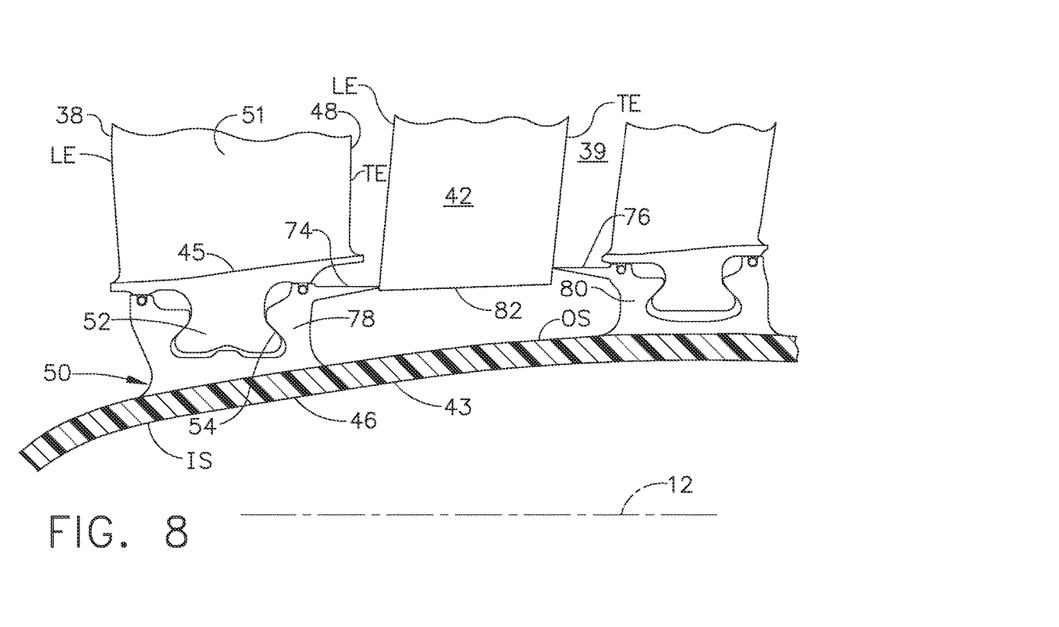
FIG. 8 is a cross-sectional view illustration of the booster spool with axially extending seal teeth on a dovetail slot ring illustrated in FIG. 5.

Illustrated in FIG. 8 are annular axially aftwardly extending and axially forwardly extending annular seal teeth 74, 76 attached to forward and aft dovetail slot metal rings 78, 80 respectively. The axially aftwardly and axially forwardly extending seal teeth 74, 76 are designed to seal against a tip 82 of the vane 42 along the leading and trailing edges LE, TE of the booster vane 42 axially located between the forward and aft dovetail slot metal rings 78, 80.

An exemplary method for fabricating the hybrid metal and composite spool 43 includes positioning the metal rings 44 in place on the outer surface OS and/or the inner surface IS of the uncured composite spool shell 46 of the spool 43 before curing the shell. A shrink bonded joint 50 between the metal rings 44 and the uncured composite spool shell 46 may be used in the case of an external ring. The shrink bonded joint 50 may include an annular adhesive layer 49 between the metal rings 44 and the uncured composite spool shell 46. This will provide for an initial compressive interfacial force at the adhesive joint at zero RPM and room temperature. As rotational speed is increased, the compressive force will be reduced and perhaps transitions to a tensile force that is still within the capabilities of the adhesive joint. An adhesive may be placed between the metal rings 44 and the outer surface OS and/or the inner surface IS of the uncured composite spool shell 46 before the curing as illustrated in FIG. 5.

The shrink fit joint may be made several ways. One method is to have the one or more metal rings 44 in place at the time the composite spool shell 46 molded and cured at elevated temperature. Since the coefficient of thermal expansion is greater for the metal rings than the composite spool shell, the external metal rings will shrink at a greater rate than the composite during cool down leaving a beneficial compressive interface. Another method includes heating the metallic rings 44 to a temperature which would allow sliding the rings over an already cured composite spool shell 46 and then allowing the rings to cool and shrink onto a film or layer of adhesive applied to the outer diameter OD or outer surface OS of the composite spool shell 46. Judiciously selecting the sizes of the components will result in the ability to adjust the compressive force to the desired level.

Various methods may be utilized to inject resin into a woven composite preform of the composite spool shell 46. Injecting the preform with resin may be performed using resin transfer molding (RTM) or vacuum-assisted resin transfer molding (VARTM) while the preform is laid up on a tool system. Alternatively, a more conventional autoclaving process may be used. When the preform is placed in the mold, various mold parts or sections hold the preform in place to properly form the composite spool shell 46.

RTM methods use RTM molds to delivers smooth surface finish on both sides of the part and can produce complex, detailed, near-net shapes at a high rate with minimal post-production trimming and/or machining The resin is delivered under pressure with the mold pieces clamped together (or held together in a press) and, thus, parts are consistent, repeatable, dimensionally stable and well-consolidated, with relatively high fiber content and excellent void control. For high-performance parts made with higher-viscosity toughened resins, molds are usually heated and resin injection pressure is controlled with a meter/mix injection machine. Raw material costs are generally less than those for hand lay-up because dry preforms are used rather than traditional prepregs. Cycle time can range from two to three hours which is shorter than typical autoclave cure cycles.

The composite preform for the composite spool shell 46 may be made from unitape, woven cloth, braid or a combination of any fiber architectures. Unitape is a unidirectional tape material and resin matrix. A discussion of this and other suitable materials may be found in the "Engineering Materials Handbook" by ASM INTERNATIONAL, 1987, 1989 or later editions. The composite materials discussed herein may be made from the non-metallic type made of a material containing a fiber such as a carbonaceous, silica, metal, metal oxide, or ceramic fiber embedded in a resin material such as Epoxy, PMR15, BMI, PEEK, etc. The fibers are unidirectionally aligned in a tape that is impregnated with a resin and formed into a part shape. Later, it is cured via an autoclaving process or press molding to form a light-weight, stiff, relatively homogeneous article having laminates or plys within. The plies are generally all made from a unidirectional fiber filament ply material, preferably a tape, as it is often referred to, arranged circumferentially around the composite preform for the composite spool shell 46.

The method may include machining interfacial surfaces of the metal rings 44 after the positioning and before or after the curing. This allows bonding in place of a metal ring 44 that is near-net shape. In subsequent operations the precise interfaces would be machined probably using the mounting hub of the spool as a datum. This approach would ensure excellent positioning and orientation of the features.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A hybrid metal and composite spool comprising one or more metal rings on an outer diameter or an outer surface of a composite spool shell of the spool; wherein
the metal rings include forward and aft dovetail slot metal rings,
an axially aftwardly extending annular tooth attached to the forward dovetail slot metal ring, and
an axially forwardly extending annular tooth attached to the aft dovetail slot metal ring.

2. The hybrid metal and composite spool as claimed in claim 1 further comprising features in the one or more metal rings.

3. The hybrid metal and composite spool as claimed in claim 2 further comprising a shrink bonded joint between the one or more metal rings and the composite spool shell.

4. The hybrid metal and composite spool as claimed in claim 2 further comprising one or more annular adhesive layers between the one or more metal rings and the composite spool shell.

5. The hybrid metal and composite spool as claimed in claim 4 further comprising a shrink bonded joint including the annular adhesive layers between the one or more metal rings and the composite spool shell.

6. The hybrid metal and composite spool as claimed in claim 2 further comprising the features including dovetail slots in the metal rings.

7. The hybrid metal and composite spool as claimed in claim 6 further comprising one or more annular adhesive layers between the one or more metal rings and the composite spool shell.

8. The hybrid metal and composite spool as claimed in claim 7 further comprising a shrink bonded joint including the annular adhesive layers between the one or more metal rings and the composite spool shell.

9. The hybrid metal and composite spool as claimed in claim 1 further comprising the metal rings including at least one single seal tooth ring with an annular radially extending tooth.

10. The hybrid metal and composite spool as claimed in claim 9 further comprising one or more annular adhesive layers between the one or more metal rings and the composite spool shell.

11. The hybrid metal and composite spool as claimed in claim 10 further comprising a shrink bonded joint including the annular adhesive layers between the one or more metal rings and the composite spool shell.

12. The hybrid metal and composite spool as claimed in claim 1 further comprising the metal rings including at least one multi-tooth seal tooth ring having at least two annular axially spaced apart seal teeth radially extending away from an annular base connecting the at least two annular axially spaced apart seal teeth.

13. The hybrid metal and compost e spool as claimed in claim 12 further comprising one or more annular adhesive layers between the one or more metal rings and the composite spool shell.

14. The hybrid metal and composite spool as claimed in claim 13 further comprising a shrink bonded joint including the annular adhesive layers between the one or more metal rings and the composite spool shell.

15. A method for fabricating a hybrid metal and composite spool comprising:
fabricating one or more metal rings with features therein,
positioning the one or more metal rings in place outer surface and/or an inner surface of an uncured composite spool shell of the spool before curing the shell, and
curing the shell with the one or more metal rings positioned in place on the outer surface and/or the inner surface;
further comprising bonding the one or more metal rings to the uncured composite spool shell by applying one or more annular adhesive layers between the one or more metal rings and the composite spool shell before the curing.

16. A method for fabricating a hybrid metal and composite spool comprising:

fabricating or e or ore metal rings with features therein,
heating the one or more metal rings to a temperature at least sufficient to slide the rings over a cured composite spool shell, p1 sliding the heated one or more metal rings in place on an outer surface of the cured composite spool shell of the spool, and
allowing the one or more metal rings to cool and shrink onto the cured shell:
further comprising machining interfacial surfaces of the one or more metal rings after the positioning and before or after the curing.

17. The method as claimed in claim 16 further comprising applying one or more annular adhesive layers on the cured composite spool shell before sliding the heated one or more metal rings in place over the one or more annular adhesive layers.

* * * * *